US012472742B2

(12) United States Patent
Takeuchi

(10) Patent No.: US 12,472,742 B2
(45) Date of Patent: Nov. 18, 2025

(54) LIQUID EJECTION HEAD, ELEMENT SUBSTRATE, AND MANUFACTURING METHODS THEREOF

(71) Applicant: CANON KABUSHIKI KAISHA, Tokyo (JP)

(72) Inventor: Souta Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 18/354,233

(22) Filed: Jul. 18, 2023

(65) Prior Publication Data

US 2024/0025175 A1 Jan. 25, 2024

(51) Int. Cl.
*B41J 2/16* (2006.01)

(52) U.S. Cl.
CPC ........... *B41J 2/1607* (2013.01); *B41J 2/1623* (2013.01); *B41J 2/1626* (2013.01); *B41J 2/1632* (2013.01); *B41J 2/1642* (2013.01)

(58) Field of Classification Search
CPC ...... B41J 2/1607; B41J 2/1623; B41J 2/1626; B41J 2/1632; B41J 2/1642; B41J 2/1606; B41J 2/161; B41J 2/1628
See application file for complete search history.

(56) References Cited

FOREIGN PATENT DOCUMENTS

| | | |
|---|---|---|
| JP | 4692534 B2 | 6/2011 |
| JP | 5218164 B2 | 6/2013 |

*Primary Examiner* — Lisa Solomon
(74) *Attorney, Agent, or Firm* — Canon U.S.A., Inc. IP Division

(57) ABSTRACT

A method for manufacturing an element substrate of a liquid ejection head, the method includes forming a silicon-based film layer including carbon on one surface of a base substrate, laminating a silicon substrate on the film layer formed on the one surface of the base substrate and bonding the silicon substrate to the film layer, processing the silicon substrate bonded to the film layer using the film layer as a stop layer and forming a lower hole portion, processing the base substrate using the film layer as the stop layer and removing the base substrate to expose the film layer, and forming an opening portion communicating with the lower hole portion in the exposed film layer.

6 Claims, 5 Drawing Sheets

LIQUID EJECTION HEAD, ELEMENT SUBSTRATE, AND MANUFACTURING METHODS THEREOF

BACKGROUND

Field of the Disclosure

The present disclosure relates to a liquid ejection head, an element substrate, and manufacturing methods of them.

Description of the Related Art

In recent liquid ejection heads, various types of liquid ink, such as pigment-based ink having pH of about 8 to 9, are used to form high quality images. However, the use of such ink may dissolve silicon (Si) and silicon monoxide (SiO), which are common materials for ejection port forming members, and change a shape and dimensions of an ejection port. In a method for manufacturing a nozzle substrate (an ejection port forming member) of a liquid ejection head described in Japanese Patent No. 5218164, a concave portion that becomes a nozzle hole is formed on a silicon substrate coated with a thermal oxidation film (a silicon dioxide ($SiO_2$) film), and then the $SiO_2$ film is removed. The silicon substrate is coated again with an oxide-based metal film (for example, a $SiO_2$ film) as an ink-resistant protective film, and then a glass substrate is laminated thereon. In a method for manufacturing a nozzle substrate of a liquid ejection head described in Japanese Patent No. 4692534, after forming a concave portion on a silicon substrate coated with a $SiO_2$ film, the $SiO_2$ film is removed, and the silicon substrate is coated with a tantalum pentoxide ($Ta_2O_5$) film.

SUMMARY

According to an aspect of the present disclosure, a method for manufacturing an element substrate of a liquid ejection head, the method includes forming a silicon-based film layer including carbon on one surface of a base substrate, laminating a silicon substrate on the film layer formed on the one surface of the base substrate and bonding the silicon substrate to the film layer, processing the silicon substrate bonded to the film layer using the film layer as a stop layer and forming a lower hole portion, processing the base substrate using the film layer as the stop layer and removing the base substrate to expose the film layer, and forming an opening portion communicating with the lower hole portion in the exposed film layer.

Further features of the present disclosure will become apparent from the following description of exemplary embodiments with reference to the attached drawings.

DESCRIPTION OF THE EMBODIMENTS

In a method for manufacturing an ejection port forming member of a liquid ejection head described in Japanese Patent No. 5218164, for example, an oxide-based metal film, such as a silicon dioxide ($SiO_2$) film, is formed but its chemical resistance is not sufficient. In addition, a manufacturing process is complicated because an entire ejection port forming member is completely coated with the oxide-based metal film. An ejection port of a liquid ejection head described in Japanese Patent No. 4692534 is highly resistant to alkaline liquid, but a manufacturing process is complicated as with the method described in Japanese Patent No. 5218164 because it is necessary to completely coat an entire ejection port forming member with a tantalum pentoxide ($Ta_2O_5$) film.

Exemplary embodiments of the present disclosure will be described below with reference to the attached drawings.

Configuration of Liquid Ejection Head

Figure 1:
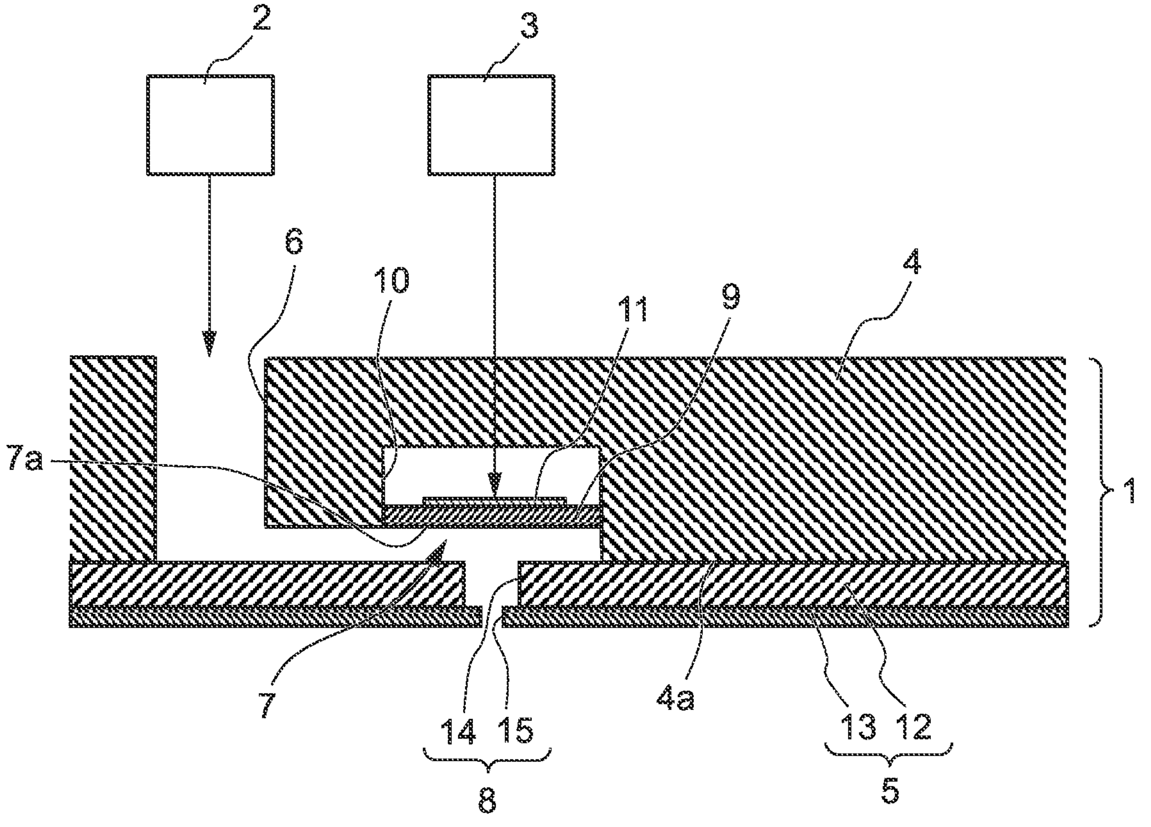
FIG. 1 is a schematic cross-sectional view of a liquid ejection head according to a first exemplary embodiment of the present disclosure.

FIG. 1 illustrates a liquid ejection head including an element substrate 1 manufactured based on a manufacturing method according to the present disclosure. The liquid ejection head includes the element substrate 1, a liquid container (for example, an ink tank) 2 for supplying liquid (for example, ink) to the element substrate 1, and an electric wiring member (for example, a flexible wiring board) 3 for supplying an electrical signal to the element substrate 1. For convenience sake, FIG. 1 schematically illustrates the liquid container 2 and the electric wiring member 3.

The element substrate 1 is a laminate of a substrate 4 and an ejection port forming member 5. The substrate 4 includes a supply path 6 that is connected to the liquid container 2 and supplied with liquid therefrom and a groove portion 7*a* that forms a flow path 7 communicating with the supply path 6. The groove portion 7*a* is a concave portion provided in a bonding surface 4*a* of the substrate 4 to be bonded to the ejection port forming member 5. If the substrate 4 is bonded to the ejection port forming member 5, an opening portion of the groove portion 7*a* is substantially closed by the ejection port forming member 5, and the flow path 7 is formed. An ejection port 8 is formed in the ejection port forming member 5, and the flow path 7 communicates with the ejection port 8 (more specifically, a lower hole portion 14 of a silicon substrate 12) of the ejection port forming member 5. A part of a wall of the flow path 7 on a side opposite to a silicon substrate side (an opposite side of the bonding surface 4*a* of the substrate 4) is configured with a vibration plate 9 having flexibility. A hollow cavity portion 10 is provided on a position opposite to the flow path 7 (the opposite side of the bonding surface 4*a* of the substrate 4) across the vibration plate 9. An energy generating element that imparts ejection energy for ejecting the liquid in the flow path 7 from the ejection port 8 to the outside is arranged on the vibration plate 9. According to the present exemplary embodiment, a piezoelectric element (a piezo element) 11, which is an example of an energy generating element, is arranged on the vibration plate 9. The piezoelectric element 11 is connected to the electric wiring member 3 (for example, the flexible wiring board) via wiring not illustrated.

The ejection port forming member 5 includes the silicon substrate 12 and a film layer 13 formed on a surface of the silicon substrate 12. The silicon substrate 12 is provided with the lower hole portion 14 penetrating through the silicon substrate 12. The film layer 13 is provided with an opening portion 15 having a diameter smaller than that of the lower hole portion 14 and penetrating through the film layer 13. The lower hole portion 14 and the opening portion 15 are concentrically arranged and communicated to form the ejection port 8. The film layer 13 is a silicon-based film layer including carbon (for example, a silicon carbide (SiC) film). An end portion exposed to the outside of the ejection port 8, that is, an inner circumferential surface of the opening portion 15 is made only of the silicon-based film layer 13 including carbon. The film layer 13 may be made of at least one of a SiC film, a silicon oxycarbide (SiOC) film, a silicon carbon nitride (SiCN) film, and a silicon oxycarbonitride (SiOCN) film.

In the liquid ejection head, the liquid is supplied from the liquid container 2 to the flow path 7 via the supply path 6. If an electrical signal is supplied from the electric wiring member 3 to the piezoelectric element 11 via wiring (not illustrated), the piezoelectric element 11 bends and deforms the vibration plate 9 by the piezoelectric effect and applies pressure (ejection energy) to the liquid in the flow path 7. A part of the liquid in the flow path 7 to which pressure is applied from the piezoelectric element 11 and the vibration plate 9 is ejected from the ejection port 8 to the outside as a droplet. In this way, the droplet ejected from the ejection port 8 to the outside adheres to, for example, a recording medium (not illustrated) located outside the liquid ejection head, and thus image formation or the like is performed.

Manufacturing Method of Liquid Ejection Head

Figure 2A:
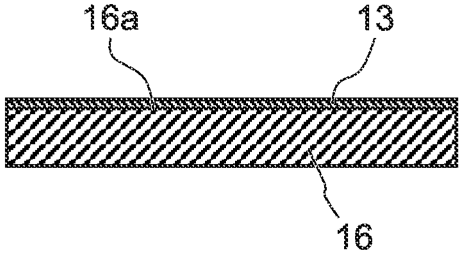
FIGS. 2A to 2H are cross-sectional views sequentially illustrating a manufacturing method of an element substrate of the liquid ejection head illustrated in FIG. 1.
Figure 2B:
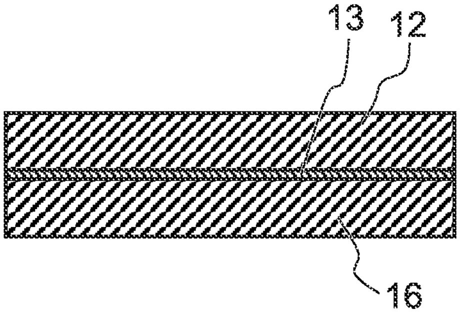
Figure 2C:
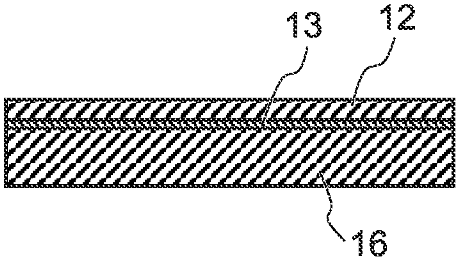
Figure 2D:
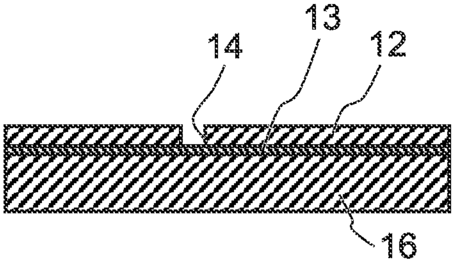

The manufacturing method of the liquid ejection head illustrated in FIG. 1 is described. FIGS. 2A to 2H are cross-sectional views sequentially illustrating respective processes in the manufacturing method of the liquid ejection head according to the present exemplary embodiment. First, as illustrated in FIG. 2A, the film layer 13 is formed on one surface 16*a* of a base substrate 16 and is subjected to surface treatment. Subsequently, as illustrated in FIG. 2B, the silicon substrate 12 is laminated on and bonded to the film layer 13 on the base substrate 16. Accordingly, the film layer 13 is sandwiched between the silicon substrate 12 and the base substrate 16. Desirably, the base substrate 16 and the silicon substrate 12 are made of silicon, and the film layer 13 is made of a silicon-based film layer including carbon (for example, a SiC film). The film layer 13 is in a state of being sandwiched inside one laminate (silicon member) formed by bonding a pair of silicon substrates (the silicon substrate 12 and the base substrate 16) to each other. As illustrated in FIG. 2C, the silicon substrate 12 is ground or polished from a side opposite to the film layer 13 and the base substrate 16 so that a sum of thicknesses of the silicon substrate 12 and the film layer 13 becomes a desired thickness (a desired thickness of the ejection port forming member 5). As illustrated in FIG. 2D, in a state in which the sum of thicknesses of the silicon substrate 12 and the film layer 13 reaches the desired thickness, the silicon substrate 12 is processed (etched) to form the lower hole portion 14 that is a part of the ejection port 8. At the time of the etching processing, the film layer 13 can function as a stop layer (an etching stop layer) by taking advantage of an etching speed difference between the silicon substrate 12 and the film layer 13 made of SiC or the like.

Figure 2E:
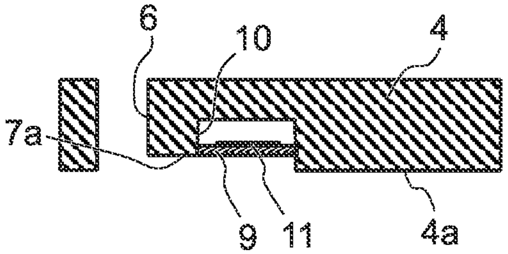
Figure 2F:
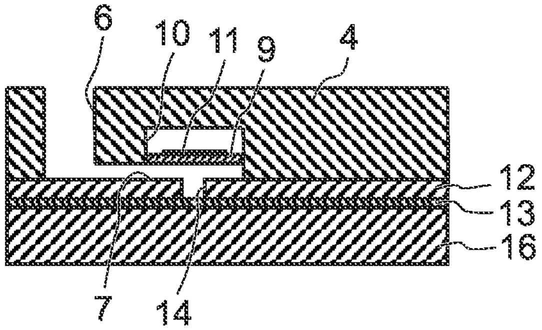
Figure 2G:
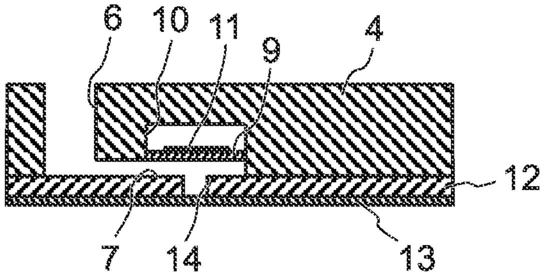

As illustrated in FIG. 2E, the substrate 4 is prepared in which the piezoelectric element 11, the vibration plate 9, the cavity portion 10, the supply path 6, and the groove portion 7*a* are formed. Then, as illustrated in FIG. 2F, the substrate 4 is laminated on and bonded to the laminate (silicon member) illustrated in FIG. 2D. Accordingly, the opening portion of the groove portion 7*a* is substantially closed by the ejection port forming member 5 to form the flow path 7. As illustrated in FIG. 2G, at least a part of the base substrate 16 is removed by processing (grinding, polishing, or etching) from the side opposite to the silicon substrate 12 and the film layer 13 to expose the film layer 13. At the time of the processing, the film layer 13 can function as the stop layer by taking advantage of a difference in grinding or polishing speed or an etching speed difference between the base substrate 16 made of silicon and the film layer 13 made of SiC or the like.

Figure 2H:
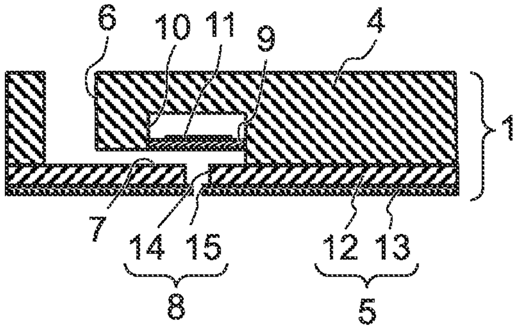

As illustrated in FIG. 2H, the film layer 13 is etched to form the opening portion 15, and the lower hole portion 14 and the opening portion 15 are communicated to form the ejection port 8. In this way, the element substrate 1 of the liquid ejection head, which is the laminate of the ejection port forming member 5 including the silicon substrate 12 and the film layer 13 and the substrate 4, is manufactured. Further, the electric wiring member (for example, the flexible wiring board) 3 is connected to the piezoelectric element 11 via the wiring (not illustrated), the liquid container (for example, the ink tank) 2 is connected to the supply path 6, another member (not illustrated) is further assembled, and thus the liquid ejection head (refer to FIG. 1) is completed.

The film layer 13 according to the present exemplary embodiment is made of a silicon-based film layer including carbon. A silicon-based film layer has higher resistance to various substances, such as ink resistance, acid resistance, alkali resistance, and etching resistance, according to a carbon content. Thus, compared with the silicon substrate 12 and the base substrate 16 made of silicon including no carbon, the silicon-based film layer 13 including carbon has a slow grinding or polishing speed and etching speed and functions as the stop layer in grinding, polishing, or etching. The film layer 13 can function as an appropriate stop layer by adjusting the carbon content therein. As an example, if a carbon content in a composition ratio of an amorphous silicon-based film layer 13 is 1% or more, more preferably 5% or more, the film layer 13 can sufficiently function as an etching stop layer. As a result, the opening portion 15 (the end portion exposed to the outside of the ejection port 8) can be formed in a good shape with good dimensional precision. In addition, the film layer 13 has the ink resistance, so that reduction in thickness of the ejection port forming member 5 and deformation of the ejection port 8 are less likely to occur even in a long term use of the liquid ejection head, and good liquid ejection performance is maintained.

According to the present exemplary embodiment, the film layer 13 formed on the base substrate 16 is transferred to the silicon substrate 12. Accordingly, the film layer 13 can be formed easily and accurately. Since the base substrate 16 is finally removed and does not remain in the liquid ejection head in a completed state, there is no need to form various concave portions or convex portions. Thus, the surface (one surface) 16*a* of the base substrate 16 on which the film layer 13 is formed can be formed flat, and as a result, it is possible to form a good film on the surface 16*a* of the base substrate 16 without performing processing or filling a member for smoothing unevenness thereon. Particularly, in a case where the film layer 13 having a crystal structure is formed on the base substrate 16 by epitaxial growth and is transferred to the silicon substrate 12, the film layer 13 having few defects and high mechanical strength can be formed. The film layer 13 made of amorphous SiC or the like can also be formed on the base substrate 16 by a plasma-enhanced chemical vapor deposition (PE-CVD) method and transferred to the silicon substrate 12. In that case, a good film layer 13 can be formed at low cost by performing the PE-CVD method while appropriately controlling film stress and density.

Further, according to the present exemplary embodiment, the silicon substrate 12 and the film layer 13 forming the ejection port forming member 5 can be transported or processed (for example, thinning the silicon substrate 12 and forming the lower hole portion 14) in a state of being bonded to the base substrate 16. Even in a case where the thickness of the silicon substrate 12 is thin (for example, about 100 μm thick), the base substrate 16 functions as a support member of the silicon substrate 12, so that the silicon substrate 12 can be transported or processed stably and successfully. The film layer 13 formed on the base substrate 16 is transferred to the silicon substrate 12, and thus a front surface and a back surface of the film layer 13 are replaced. In other words, a surface of the film layer 13 that was in contact with the base substrate 16 is exposed outside without contacting the silicon substrate 12, and a surface of the film layer 13 that was exposed outside without contacting the base substrate 16 comes into contact with the silicon substrate 12. The replacement of the front surface and the back surface of the film layer 13 can be used to make a surface of the ejection port forming member 5, which serves as a liquid ejection surface of the liquid ejection head, smooth and good. For example, in a case where the surface of the film layer 13 in contact with the surface (one surface) 16*a* of the base substrate 16, which is formed flat as described above, is formed smooth, the smooth surface can be used as the liquid ejection surface of the liquid ejection head in the completed state. Accordingly, the good liquid ejection performance can be acquired.

Another Exemplary Embodiment

Figure 3:
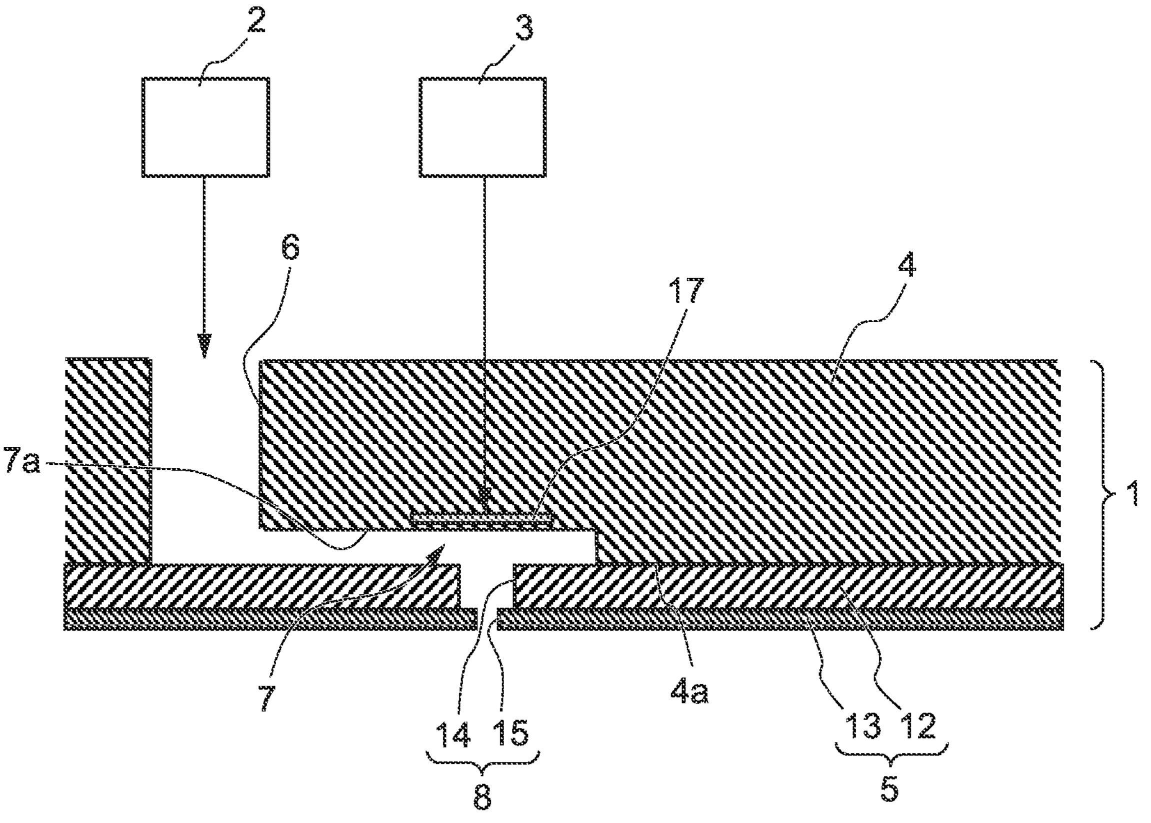
FIG. 3 is a schematic cross-sectional view of a liquid ejection head according to another exemplary embodiment.

According to the exemplary embodiment illustrated in FIGS. 1 and 2A to 2H, the piezoelectric element 11 is used as the energy generating element that generates ejection energy. However, as illustrated in FIG. 3, even in a liquid ejection head that uses another type of an energy generating element (for example, a heating element 17), the same effect as described above can be acquired by forming the silicon-based film layer 13 including carbon on the base substrate 16 and then transferring it to the silicon substrate 12. In a case where the heating element 17 is provided as the energy generating element as illustrated in FIG. 3, the vibration plate 9 and the cavity portion 10 are not formed on the substrate 4, and the heating element 17 is formed on or near an inner surface of the groove portion 7*a* formed in the substrate 4.

The base substrate 16 is not limited to a silicon substrate and may be a substrate made of other materials. However, it is desirable that the base substrate 16 is a single crystal silicon substrate because the film layer 13 can be easily formed by applying a thin film deposition technique generally used in a semiconductor manufacturing method. Further, since the base substrate 16 made of silicon is flat and has a small surface roughness, the base substrate 16 has a good bonding property with the film layer 13 and is desirable because the film layer 13 can be satisfactorily formed and transferred to the silicon substrate 12.

EXAMPLE

Specific examples of the manufacturing method of the liquid ejection head according to the present disclosure are described.

According to a first example of the present disclosure, both of the base substrate 16 and the silicon substrate 12 are single crystal silicon substrates having a thickness of 625 μm, and the film layer 13 is made of a SiC film. First, as illustrated in FIG. 2A, a SiC film layer was formed on the one surface 16*a* of the base substrate 16 by epitaxial growth. Specifically, the film layer 13 having a thickness of 1 μm and a crystal structure of hexagonal (4H)—SiC was formed on the base substrate 16 by epitaxial growth at a temperature of 1600° C. As illustrated in FIG. 2B, the silicon substrate 12 was laminated on the film layer 13 on the base substrate 16, and the film layer 13, the base substrate 16, and the silicon substrate 12 were bonded together using a plasma activated bonding method by applying a force of 20 kN at a temperature of 300° C. As illustrated in FIG. 2C, the silicon substrate 12 was ground or polished until the sum of thicknesses of the film layer 13 and the silicon substrate 12 reached 100 μm (the desired thickness of the ejection port forming member 5). As illustrated in FIG. 2D, deep reactive ion etching (DEEP-RIE) was performed on the silicon substrate 12 using the film layer 13 as the stop layer (the etching stop layer), and a through hole (the lower hole portion 14) having a circular planar shape with a diameter of 100 μm was formed.

As illustrated in FIG. 2E, the substrate 4 was prepared in which the piezoelectric element 11, the vibration plate 9, the cavity portion 10, the supply path 6, and the groove portion 7*a* were formed. As illustrated in FIG. 2F, the substrate 4 was laminated to the silicon substrate 12, which forms a surface opposite to the base substrate 16 of the laminate (refer to FIG. 2D) formed of the silicon substrate 12, the film layer 13, and the base substrate 16. Then, the silicon substrate 12 and the substrate 4 were bonded at a low temperature using an adhesive. Damage to many various functional elements formed on the substrate 4 was mainly avoided by bonding at the low temperature using the adhesive. As illustrated in FIG. 2G, the base substrate 16 was removed by polishing to expose the film layer 13. At this time, the film layer 13 was used as the stop layer for polishing processing by taking advantage of the difference in polishing speed between the silicon forming the base substrate 16 and the SiC forming the film layer 13. As illustrated in FIG. 2H, reactive ion etching (RIE) was performed on the film layer 13, and a through hole (the opening portion 15) having a circular plane shape with a diameter of 20 μm was formed. The opening portion 15 and the lower hole portion 14 were arranged concentrically and communicated to form the ejection port 8.

A simple storage test was performed on the element substrate 1 that was manufactured as described above by supplying liquid ink including a pigment having pH of about 8 to 9 thereto. As a result, it was found that there was no reduction in the thickness of the film layer 13 and no deformation of the ejection port 8, and that the element substrate 1 had sufficient ink resistance. According to the present example, the film layer 13 was formed on the base substrate 16 by epitaxial growth that forms SiC crystals with very few crystal defects, so that the film layer 13 had very few defects, and the ejection port forming member 5 having extremely high mechanical strength could be formed. According to the present example, the opening portion 15 that configures a particularly important tip portion (the portion exposed to the outside) in the ejection port 8 is formed of the silicon-based film layer 13 including carbon, which is highly resistant to various types of liquid. Accordingly, a shape and dimensions of the tip portion of the ejection port 8 can be maintained with high precision, and good liquid ejection performance can be acquired.

As modifications of the present example, although not illustrated, the element substrate 1 in which the film layer 13 had a thickness of 5 μm and the element substrate 1 in which the film layer 13 had a thickness of 10 μm were also manufactured. Descriptions of these modifications are omitted because the configuration other than the thickness of the film layer 13 and the manufacturing method were not changed. The same effect as described above was acquired by these modifications. Thus, according to the present example, deformation due to film stress of the film layer 13 was small, and the film layer 13 could be stably formed from a relatively thin one to a relatively thick one (for example, in a film thickness range of 1 μm or more and 10 μm or less).

According to a second example of the present disclosure, only a part of the processes was changed in the manufacturing method of the liquid ejection head of the above-described first example, and the other processes were the same as those in the first example, so that the descriptions thereof are omitted. According to the present example, although not illustrated, the film layer 13 made of an amorphous SiC film having a thickness of 3 μm was formed on the one surface 16*a* of the base substrate 16 by the PE-CVD method at a temperature of 60° C. Then, the surface of the film layer 13 (the surface to be bonded to the silicon substrate 12) was ground or polished so that the surface roughness was 1 nm or less. Then, the base substrate 16 having the film layer 13 and the silicon substrate 12 were bonded to each other using the same method as that of the first example, the silicon substrate 12 was thinned by grinding or polishing, and the lower hole portion 14 was formed in the silicon substrate 12. Further, the substrate 4 was laminated and bonded to the silicon substrate 12 using the same method as that of the first example, the base substrate 16 was removed by polishing to expose the film layer 13, and the opening portion 15 was formed in the film layer 13.

A simple storage test similar to that in the first example was performed on the element substrate 1 that was manufactured as described above, and it was found that there was no reduction in the thickness of the film layer 13 and no deformation of the ejection port 8, and that the element substrate 1 had sufficient ink resistance. According to the present example, the PE-CVD method was performed on the base substrate 16 at a relatively low temperature (60° C.), and thus internal film stress can be suppressed even in an amorphous film with poor crystallinity. If the internal film stress is large, shrinkage deformation due to the internal film stress may occur in a portion (a membrane portion) of the film layer 13 that is not supported by the silicon substrate 12 and protrudes toward the center of the ejection port 8 in the completed state of the ejection port 8, and it may become difficult to maintain the shape of the film layer 13. However, according to the present example, the PE-CVD method is performed at a low temperature, so that the internal film stress can be reduced, and deformation of the film layer 13 can be suppressed. A film formed by the PE-CVD method has a large surface roughness, but according to the present example, the film layer 13 is subjected to the surface treatment (grinding or polishing) to reduce the surface roughness and thus can be well bonded to the silicon substrate 12.

If a thick film is formed as the film layer 13, deformation of the element substrate 1 is increased, and accordingly, for example, there is a risk of hindering smooth movement of the liquid ejection head and smooth conveyance of a recording medium facing the liquid ejection head. However, according to the present example, a thin film is formed as the film layer 13, and the internal film stress is reduced as described above, so that the deformation of the element substrate 1 can be suppressed, and a defect associated with the deformation can be avoided.

As described above, according to the present example, a good film layer 13 can be formed by the PE-CVD method by adjusting a temperature and performing the surface treatment after film formation. The PE-CVD method can be performed with a relatively simple and inexpensive apparatus, thus according to the present example, a production facility for the element substrate 1 can have a simple and inexpensive structure, and a manufacturing cost of the liquid ejection head can be reduced. Epitaxial growth is crystal growth, it is necessary to use other measures such as ion doping to adjust a film composition, and it is not possible to easily adjust the film composition. In contrast, in the PE-CVD method, a film to be formed is an amorphous film, so that, in a case of similar types of silicon-based films, such as SiOC, SiCN, and SiOCN, other than SiC, a desired film composition can be easily acquired by simply changing a ratio of material gases in film formation. However, due to a characteristic of an amorphous film, there is a contradictory relationship that if the film stress is reduced to suppress the deformation of the element substrate 1 as described above, a film density is reduced. If the film density is reduced, there is a possibility that the strength of the film cannot be maintained, and the film cannot be stably formed. Thus, it is desirable to make the film stress of the film layer 13 a compressive stress of 800 MPa or less and make the film density 1.5 g/cm$^3$ or more. For example, the film layer 13 according to the present example is a SiC film having a compressive film stress of 600 MPa and a film density of 2.3 g/cm$^3$.

As a modification of the present example, although not illustrated, the element substrate 1 in which the film layer 13 had a thickness of 5 μm was also manufactured. Descriptions of the present modification are omitted because the configuration other than the thickness of the film layer 13 and the manufacturing method were not changed. The same effect as described above was acquired by the present modification. In other words, even if the thickness of the film layer 13 according to the present example varies to some extent (for example, in the film thickness range of 1 μm or more and 10 μm or less as in the first example), a good effect was acquired.

Figure 4:
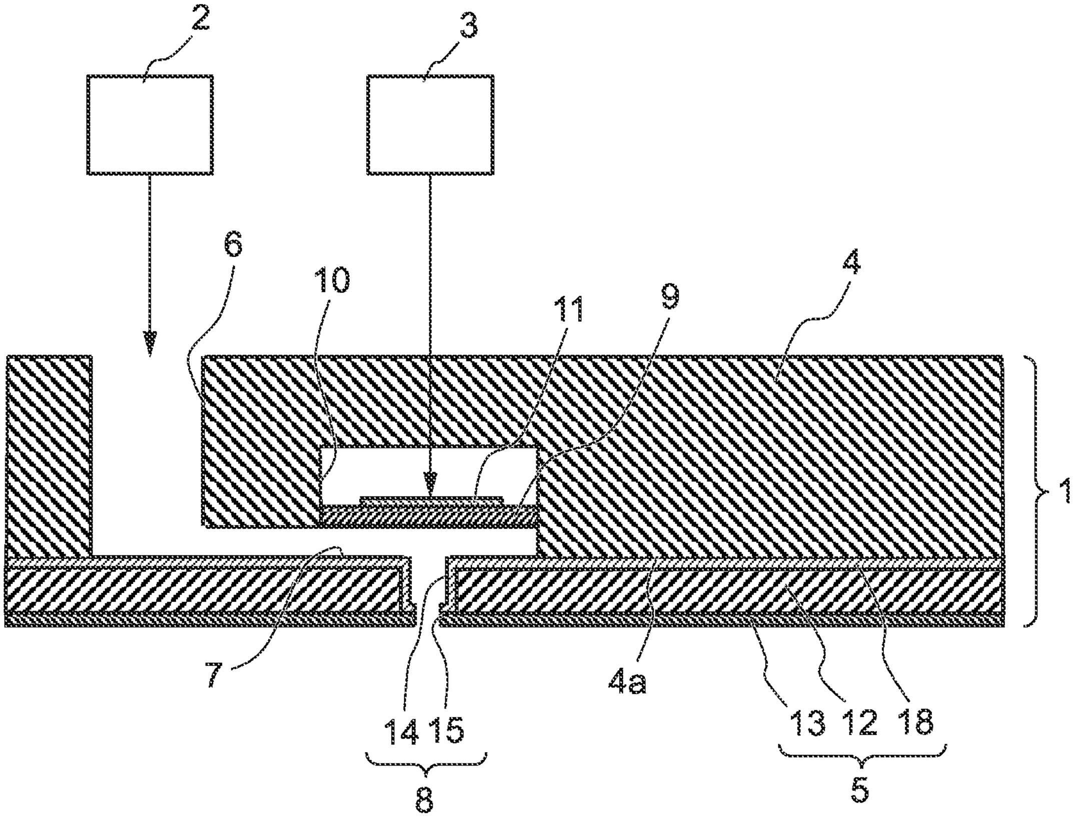
FIG. 4 is a schematic cross-sectional view of a liquid ejection head according to a third example of the present disclosure.

According to a third example of the present disclosure, a liquid ejection head illustrated in FIG. 4 was manufactured. In the liquid ejection head, an auxiliary film layer 18 is provided on a surface opposite to the film layer 13 and an inner circumferential surface of the lower hole portion 14 of the silicon substrate 12 on which the lower hole portion 14 is formed. Thus, according to the present example, a process for forming the auxiliary film layer 18 is added after forming the lower hole portion 14 in the silicon substrate 12.

Figure 5A:
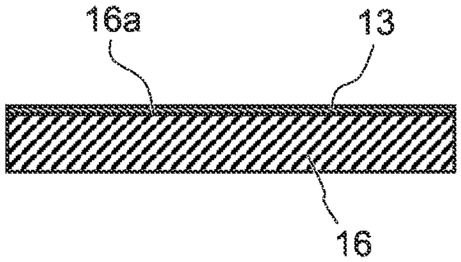
FIGS. 5A to 5I are cross-sectional views sequentially illustrating a manufacturing method of an element substrate of the liquid ejection head illustrated in FIG. 4.
Figure 5B:
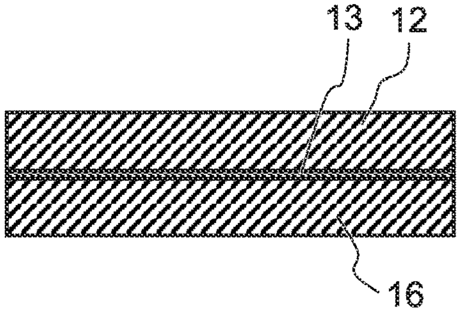
Figure 5C:
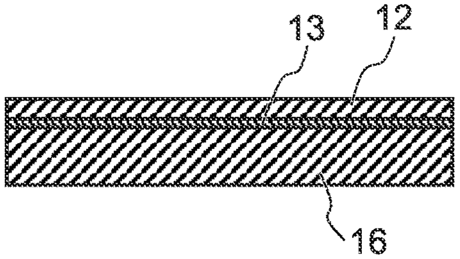
Figure 5D:
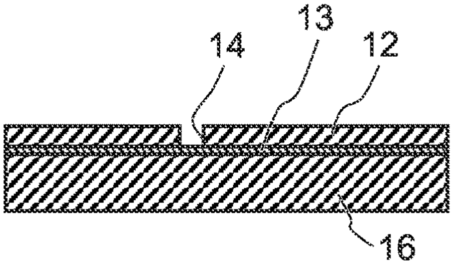
Figure 5E:
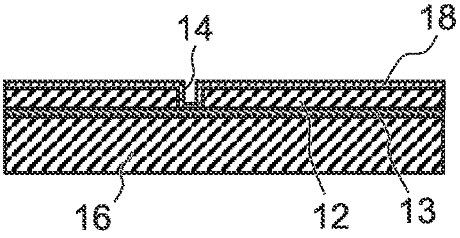
Figure 5F:
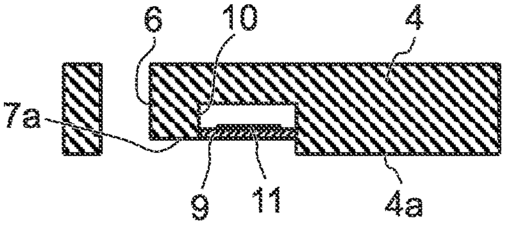
Figure 5G:
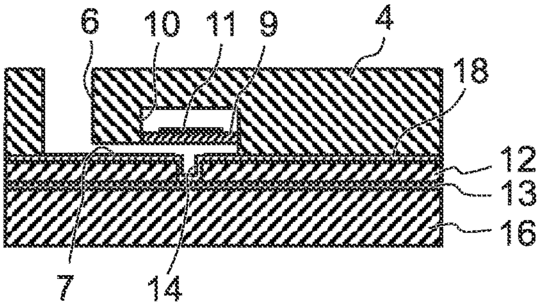
Figure 5H:
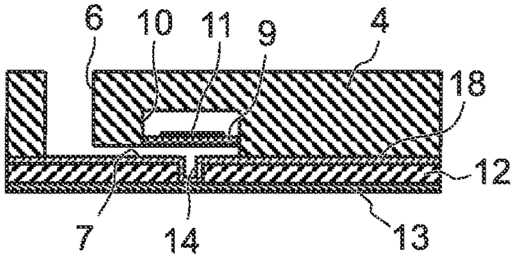
Figure 5I:
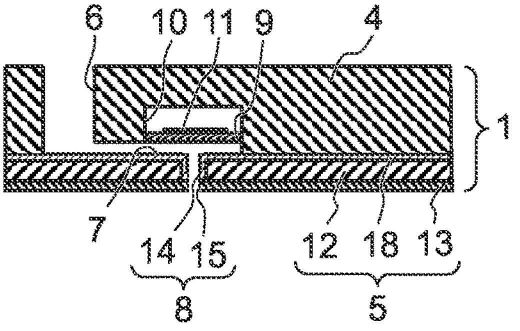

In other words, according to the present example, as illustrated in FIG. 5A, the film layer 13 made of an amorphous SiCN film having a thickness of 1.5 μm was formed on one surface 16*a* of the base substrate 16 similar to that of the first example by the PE-CVD method at a temperature of 60° C. The surface of the film layer 13 was ground or polished to reduce the surface roughness as in the second example. Then, the base substrate 16 having the film layer 13 and the silicon substrate 12 were bonded to each other as illustrated in FIG. 5B, the silicon substrate 12 was thinned by grinding or polishing as illustrated in FIG. 5C, and the lower hole portion 14 was formed in the silicon substrate 12 as illustrated in FIG. 5D. Then, as illustrated in FIG. 5E, the PE-CVD method was performed at a temperature of 60° C. to form a silicon-based auxiliary film layer 18 including carbon, specifically, the auxiliary film layer 18 made of a SiOC film having a thickness of 1.5 μm on a surface of the silicon substrate 12 excluding a surface in contact with the film layer 13. Subsequently, as illustrated in FIG. 5G, the substrate 4 illustrated in FIG. 5F was laminated and bonded to the silicon substrate 12 illustrated in FIG. 5E. As illustrated in FIG. 5H, the base substrate 16 was removed by polishing to expose the film layer 13. Then, as illustrated in FIG. 5I, the opening portion 15 penetrating through the film layer 13 was formed by the RIE. On the inner circumferential surface of the opening portion 15, a laminated structure having a total film thickness of 3.0 μm and configured with the film layer 13 made of the amorphous SiCN film having the thickness of 1.5 μm and the auxiliary film layer 18 made of the SiOC film having the thickness of 1.5 μm exists. The laminated structure of the film layer 13 and the auxiliary film layer 18 has an average carbon content of 5% or more, a compressive film stress of 800 MPa or less, a film density of 1.5 $g/cm^3$ or more, and a total film thickness of 1 μm or more and 10 μm or less. According to the present example, the film layer 13 made of the SiCN film had a compressive film stress of 400 MPa and a density of 2.4 $g/cm^3$, and the auxiliary film layer 18 made of the SiOC film had a compressive film stress of 200 MPa and a density of 2.1 $g/cm^3$. Except for the matters described above, the configuration and manufacturing method of the liquid ejection head according to the present example were the same as those of the liquid ejection head according to the second example, and thus the descriptions thereof are omitted.

A simple storage test similar to that in the first example was performed on the element substrate 1 according to the present example, and it was found that there was no reduction in the thicknesses of the film layer 13 and the auxiliary film layer 18 and no deformation of the ejection port 8, and that the element substrate 1 had sufficient ink resistance. According to the present example, an inner circumferential surface of the ejection port 8 is formed of two laminated films (the film layer 13 and the auxiliary film layer 18). In this configuration, each of the two films can have a different function. Specifically, according to the present example, one film (the film layer 13) is a high density film for maintaining strength of the ejection port forming member 5, and the other film (the auxiliary film layer 18) is a low density film for relaxing the film stress. The film that exhibits the function of maintaining strength and the film that exhibits the function of relaxing film stress are used together, and thus, it is possible to achieve both of maintaining the strength especially around the ejection port 8 and suppressing deformation by reducing the film stress. Balance between the density and the film stress of the two films (the film layer 13 and the auxiliary film layer 18) can be appropriately set so as to acquire desired strength and deformation prevention effect. This is because the auxiliary film layer 18 is in direct contact with the film layer 13, and thus it is possible to add a function to the film layer 13. In this way, the laminated structure of the film layer 13 and the auxiliary film layer 18 forms a portion around the ejection port 8. Accordingly, it is possible to make the ejection port forming member 5 thinner while suppressing the internal film stress so that particularly the portion (the membrane portion) that is not supported by the silicon substrate 12 and protrudes is not deformed. Further, according to the present example, the entire inner circumferential surface of the ejection port 8 (the inner circumferential surface of the opening portion 15 and the inner circumferential surface of the lower hole portion 14) is formed of a silicon-based film layer including carbon (the film layer 13 and the auxiliary film layer 18) that is highly resistant to various types of liquid. Thus, the shape and dimensions of the ejection port 8 as a whole can be maintained with high precision, and good liquid ejection performance can be acquired.

As a modification of the present example, although not illustrated, the element substrate 1 that included the film layer 13 made of a SiCN film having a thickness of 0.5 μm formed by the PE-CVD method and the auxiliary film layer 18 made of a SiOC film having a thickness of 0.5 μm formed by the PE-CVD method was also manufactured. The film layer 13 made of the SiCN film had a compressive film stress of 200 MPa and a density of 2.0 $g/cm^3$, the auxiliary film layer 18 made of the SiOC film had a compressive film stress of 100 MPa and a density of 1.5 $g/cm^3$, and the laminated film had a thickness of 1.0 μm. Descriptions of the present modification are omitted because the configuration other than the film layer 13 and the auxiliary film layer 18 and the manufacturing method were not changed. The same effect as described above was acquired by the present modification. According to the present modification, for example, the film layer 13 was made of a SiCN film containing 10% carbon in high density silicon nitride (SiN), the auxiliary film layer 18 was made of a SiOC film containing 10% carbon in low density SiO, and accordingly a good effect could be acquired even if a total thickness of the laminated film was as thin as about 1 μm. As described above, according to the present example, the film layer 13 and the auxiliary film layer 18 may form a laminated structure including at least two films of a SiC film, a SiOC film, a SiCN film, and a SiOCN film. In a case where a plurality of the auxiliary film layers 18 is provided, a function of each layer can be further distributed, and appropriate characteristics can be realized by appropriately combining respective film thicknesses, densities, and film stresses.

According to the first to third examples described above, it is also possible to adopt a configuration in which the heating element 17 is provided as an energy generating element as illustrated in FIG. 3. In this case, the vibration plate 9 and the cavity portion 10 are not formed in the substrate 4. With this configuration, the same effect as in the first to third examples can be exerted.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-116485, filed Jul. 21, 2022, which is hereby incorporated by reference herein in its entirety.

What is claimed is:

1. An element substrate of a liquid ejection head, the element substrate comprising:

a substrate including a groove portion configuring a flow path for liquid, a supply path for supplying liquid to the flow path, and an energy generating element that imparts ejection energy to the liquid in the flow path; and an ejection port forming member including an ejection port communicating with the flow path and laminated to the substrate, wherein the ejection port forming member includes a silicon substrate and a film layer provided on a surface of the silicon substrate, and the ejection port is formed by communicating a lower hole portion penetrating through the silicon substrate with an opening portion penetrating through the film layer, wherein the film layer is a silicon-based film layer including carbon and has a carbon content of 5% or more, and wherein the film layer has a compressive film stress of 800 MPa or less, a film density of 1.5 g/cm$^3$ or more, and a film thickness of 1 μm or more and 10 μm or less.

2. An element substrate of a liquid ejection head, the element substrate comprising:

a substrate including a groove portion configuring a flow path for liquid, a supply path for supplying liquid to the flow path, and an energy generating element that imparts ejection energy to the liquid in the flow path; and an ejection port forming member including an ejection port communicating with the flow path and laminated to the substrate, wherein the ejection port forming member includes a silicon substrate and a film layer provided on a surface of the silicon substrate, and the ejection port is formed by communicating a lower hole portion penetrating through the silicon substrate with an opening portion penetrating through the film layer, wherein an auxiliary film layer is provided on a surface opposite to the film layer of the silicon substrate and on an inner circumferential surface of the lower hole portion, wherein both of the film layer and the auxiliary film layer are made of a silicon-based film layer including carbon, and wherein a laminated structure of the film layer and the auxiliary film layer has an average carbon content of 5% or more, a compressive film stress of 800 MPa or less, a film density of 1.5 g/cm$^3$ or more, and a total film thickness of 1 μm or more and 10 μm or less.

3. The element substrate according to claim 2, wherein the laminated structure of the film layer and the auxiliary film layer includes at least two films of a SiC film, a SiOC film, a SiCN film, and a SiOCN film.

4. The element substrate according to claim 1, wherein the film layer is a SiC film having a crystal structure.

5. The element substrate according to claim 1, wherein the film layer is an amorphous SiC film, a SiOC film, a SiCN film, or a SiOCN film.

6. A liquid ejection head comprising:

the element substrate according to claim 1;

an electric wiring member connected to the energy generating element; and a liquid container connected to the supply path.

* * * * *